United States Patent

Nishioka et al.

Patent Number: 5,281,490
Date of Patent: Jan. 25, 1994

[54] PROCESS FOR PRODUCING SOLID OXIDE FUEL CELLS

[75] Inventors: Masao Nishioka, Tokoname; Hirotake Yamada, Nagoya, both of Japan

[73] Assignee: NGK Insulators, Ltd., Japan

[21] Appl. No.: 3,029

[22] Filed: Jan. 11, 1993

[30] Foreign Application Priority Data

Jan. 17, 1992 [JP] Japan .................................. 4-025865

[51] Int. Cl.$^5$ .............................................. H01M 8/12
[52] U.S. Cl. ......................................... 429/33; 429/30
[58] Field of Search ...................................... 429/33, 30

[56] References Cited

U.S. PATENT DOCUMENTS 5,035,962 7/1991 Jensen .
5,106,706 4/1992 Singh et al. ..................... 429/33 X

FOREIGN PATENT DOCUMENTS 0194380 9/1986 European Pat. Off. .
0410420 1/1991 European Pat. Off. .
62-295365 12/1987 Japan .
2-204974 8/1990 Japan .

Primary Examiner—John S. Maples
Attorney, Agent, or Firm—Parkhurst, Wendel & Rossi

[57] ABSTRACT

A process is disclosed for producing a solid oxide fuel cell including a solid electrolyte plate, and an air electrode and a fuel electrode provided on opposite surfaces of said solid electrolyte plate. The process comprising the step of joining a film of oxygen ion-conductive zirconia as the solid electrolyte plate to lanthanum manganate as the air electrode through a layer containing a compound selected from a manganese compound and a cobalt compound by press contacting them under heating.

11 Claims, 5 Drawing Sheets

FIG_7

FIG_8

FIG. 9

FIG.10 oxide by heating at not less than 1,000° C. or less in air. Solution of such compounds may be used so long as the compounds are converted to manganese oxide by heating up to 1,000° C. in air.

Manganese oxide is generally not a pure oxide, and contains small amounts of an hydrate $Mn_3O_4 \cdot H_2O$, $Mn_3O_{4-\delta}$, $Mn_3O_{4+\delta}$, $MnO(OH)$, etc. Since all types of manganese oxides are converted to $Mn_3O_4$ by heating up to 1,000° C. in air, the oxidation number or the degree of hydration of the raw manganese compound does not substantially influence the resulting product produced according to the present invention. Thus, any manganese compound which can be oxidized to $Mn_3O_4$ could be used as the adhesive in the process of the present invention. This is also applicable to the cobalt compound.

As to the cobalt compound to be used instead of manganese, it is preferable to use a cobalt compound-containing powder in which the cobalt compound is contained in an amount of not less than 10 wt % when calculated in the form of $Co_3O_4$. The remainder of the adhesive other than the cobalt compound may be one or more materials which do not afford an adverse effect upon the joining between the solid electrolyte plate and the air electrode. For example, as such remaining materials, materials constituting the solid electrolyte plate and the air electrode, etc. may be used. That is, lanthanum cobaltite, partially stabilized zirconia, cerium oxide, samarium oxide, etc. may be recited. Concretely, the cobalt compound-containing adhesive may be composed of $Co_3O_4$ powder, CoO powder, a mixed powder of lanthanum cobaltite and cobalt oxide, a mixed powder of partially stabilized zirconia and cobalt oxide, a mixed powder of cerium oxide, samarium oxide and cobalt oxide, lanthanum cobaltate containing an excess amount of cobalt or the like may be employed.

As cobalt oxide, use may be made of $CoO_\alpha$ in which $1 \leq \alpha \leq 2$. As the material which is converted to cobalt oxide by heating, numerous compounds may be recited. For example, cobalt carbonate, cobalt nitrate, cobalt sultate, cobalt chloride, organic metal compounds such as cobalt alcolate, cobalt carbonyl and alkyl-cobalt, metallic cobalt itself, etc. may be recited. Such compounds are oxidized to cobalt oxide by heating at not less than 950° C. or less in air. Solution of such compounds may be used so long as the compounds are converted to cobalt oxide by heating up to 950° C. in air.

As the air electrode, use is preferably made of lanthane manganate represented by $La_x(Ca$ and/or $Sr)_yMnO_3$ in which $0.95 < x+y \leq 1.05$, $0.60 \leq x \leq 0.90$, and $0.10 \leq y \leq 0.40$.

The solid electrolyte plate and lanthane manganate as the air electrode used in the present invention are preliminarily fired or sintered.

These and other objects, features and advantages of the same will be appreciated upon reading of the following description of the invention when taken in conjunction with the attached drawings, with the understanding that some modifications, variations, or changes could be made by the skilled in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
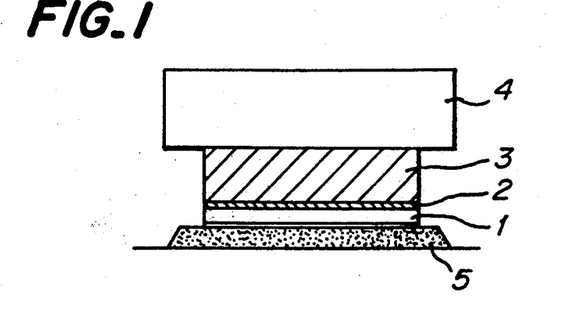
FIG. 1 is a view illustrating an example in which joining is effected by press contacting under heating to perform the producing process according to the present invention.

FIG. 1 is a view illustrating an example of the press joining under heating to effect the producing process according to the present invention. In the example of FIG. 1, a manganese compound-containing adhesive layer is formed on a surface of a dense sintered body 1 made of zirconia stabilized with 8 mol % yttrium (hereinafter referred to briefly as "8YSZ") by applying a manganese compoud-containing compound thereonto in a form of a slurry or a powder in such an amount of 0.3 to 4 mg/cm² as calculated in the form of $Mn_3O_4$ (A slurry containing $Mn_3O_4$ or $Mn_3O_4$ powder itself may be used). The grain size of $Mn_3O_4$ may be 0.1 to 0.5 μm and the average particle diameter of $Mn_3O_4$ may be 0.3 μm. The composition of the slurry may be $Mn_3O_4$:an appropriate solvent:an appropriate dispersant:an appropriate binder = 40:100:2:20 in terms of parts by weight. The composition of the slurry may have an arbitrary compounding ratios so long as the slurry may have such a fluidity as to be sprayed by a spray gun. The thickness of the sintered body 1 is 0.2 mm. Then, a porous sintered body 3 made of $La_{0.8}Ca_{0.2}MnO_3$ is placed on the $Mn_3O_4$ powder layer 2, and further an $Al_2O_3$ or a $ZrO_2$ sintered body 4 is placed on the porous sintered body 3 as a weight. The porous sintered body 3 has a thickness of 2 to 3 mm and a porosity of 25 to 35%. Then, a load of 0.1 to 3.0 kgf/cm² is applied to the thus formed laminate. In order to apply the load uniformly over the joining surfaces, #240 $Al_2O_3$ powder is paved under the 8YSZ sintered body 1 placed in an electric furnace not shown. The laminate is fired at 1,300° C. to 1,500° C. for

PROCESS FOR PRODUCING SOLID OXIDE FUEL CELLS

BACKGROUND OF THE INVENTION

(1) Field of the Invention

The present invention relates to a process for producing solid oxide fuel cells each having an air electrode and a fuel electrode provided on opposite surfaces of a solid electrolyte plate, respectively.

(2) Related Art Statement

Recently, the fuel cells have attracted attention as a power generator. The fuel cell is a device capable of directly converting chemical energy possessed by a fuel to electric energy. Since this device is not restricted by the Carnot cycle, the device has essentially high energy conversion efficiency, and a variety of fuels such as naphtha, natural gas, methanol, coal-reformed gas and heavy oil can be used. Further, the device is less public nuisance, and the power-generating efficiency thereof is not influenced by the scale of the plant. Thus, the fuel cell is an extremely promising technique.

Particularly, since the solid oxide fuel cell (hereinafter referred to briefly as SOFC) works at high temperature around 1,000° C., its electrode reaction is extremely active. Therefore, a noble metallic catalyst such as precious platinum is completely unnecessary. Further, the SOFC has small polarization and relatively high output voltage. Accordingly, the SOFC has far higher energy-converting efficiency as compared with other fuel cells. Furthermore, since structural materials are all solid, the SOFC is stable, and has long service life.

In order to produce a solid oxide fuel cell having an air electrode and a fuel electrode provided on opposite surfaces of a solid electrolyte plate, respectively, as one type of the above-mentioned solid oxide fuel cells, processes have been formerly known, in which a film of partially stabilized zirconia as a solid electrolyte is formed on an electrically conductive substrate as an air electrode by slurry coating, EVD, or plasma spraying. To the contrary, there are also known a process in which an air electrode and a fuel electrode are each formed by screen printing electrically conductive materials on an ion-conductive zirconia and firing them, and a process in which a film of green sheet made of ion-conductive zirconia and green sheets as electrodes are laminated one upon another, and then co-sintered.

However, among the above processes, the slurry-coating method and the plasma-spraying method have a problem in that a dense film of zirconia is difficult to obtain. On the other hand, the EVD method has problems in that the device is of a great scale, and a production cost becomes greater. Furthermore, the electrically conductive material-screen printing method has a problem in that since the zirconia film itself maintains strength, the strength of the fuel cell decreases. In addition, the co-sintering method has problems in that it is difficult to match the coefficient of shrinkage between the zirconia green sheet and those for the electrodes at the time of firing, and thus the shape stability after the firing becomes poor. Moreover, according to NGK's investigations, the co-sintering process has a problem in that a high resistance layer made of lanthane zirconate is formed at an interface between zirconia and the electrode to lower the power-generating efficiency.

SUMMARY OF THE INVENTION

It is an object of the present invention to solve the above-mentioned problems, and to provide a process capable of readily and inexpensively producing solid oxide fuel cells.

The present invention relates to the process for producing the solid oxide fuel cell having an air electrode and a fuel electrode provided on opposite surfaces of a solid electrolyte plate, and is characterized in that a film of oxygen ion-conductive zirconia as the solid electrolyte plate is joined to lanthanum manganate as the air electrode through powder containing a manganese compound as an adhesive by press contacting them under heating. In the present invention, a cobalt compound may be used instead of the manganese compound.

The present invention has been accomplished based on discovery that when the oxygen ion-conductive zirconia film is joined to the lanthanum manganate substrate through the specified adhesive by press contacting them under heating in the case of the cell construction in which the air electrode and the fuel electrode are provided on the opposite surfaces of the solid electrolyte plate, respectively, it is possible to obtain the solid oxide fuel cell free from the conventional defects, particularly, such as occurrence of the high resistance layer composed of lanthanum zirconate at the interface between the zirconia and the air electrode made of lanthanum manganate.

In order to increase the joint strength between the zirconia film and the air electrode and decrease the internal resistance of the fuel cell, it is preferable that the thickness of the dense zirconia film is from several tens to several hundreds $\mu$m, the porosity of the lanthanum manganate substrate is 10 to 50%, more preferably 26 to 35%, the temperature on the press joining under heating is 1,350° to 1,450° C., more preferably 1360°~1400° C. and a load on the press joining is 0.1 to 3 kgf/cm$^2$, more preferably 2~2.5 kgf/cm$^2$. As the adhesive, it is preferable to use a manganese compound-containing powder in which the manganese compound is contained in an amount of not less than 10 wt % when calculated in the form of Mn$_3$O$_4$. The remainder of the adhesive other than the manganese compound may be one or more materials which do not afford an adverse effect upon the joining between the solid electrolyte plate and the air electrode. For example, as such remaining materials, materials constituting the solid electrolyte plate and the air electrode, etc. may be recited. That is, lanthanum manganate, partially stabilized zirconia, cerium oxide, samarium oxide, etc. may be used. Concretely, the manganese compound-containing adhesive may be composed of Mn$_3$O$_4$ powder, MnO$_2$ powder, a mixed powder of lanthanum manganate and manganese oxide, a mixed powder of partially stabilized zirconia and manganese oxide, a mixed powder of cerium oxide, samarium oxide and manganese oxide, lanthanum manganate containing an excess amount of manganese or the like may be employed.

As manganese oxide, use may be made of MnO$\alpha$ in which $1 \leq \alpha \leq 3.5$. As the material which is converted to manganese oxide by heating, numerous compounds may be recited. For example, manganese hydroxide, manganese carbonate, manganese nitrate, manganese sulfate, manganate chloride, organic metal compounds such as manganese oxalate, metallic manganese itself, etc. may be recited. Such compounds are oxidized to manganese 0.5 to 5 hours in air, thereby obtaining a joined body. Finally, a solid oxide fuel cell can be obtained by providing a fuel electrode on a side of the 8YSZ sintered body 1 which is opposed to the side upon which the porous sintered body 3 is provided.

Next, working examples of the present invention will be explained.

Experiment 1

A substrate made of $La_{0.8}Ca_{0.2}MnO_3$ (hereinafter referred to briefly as LCM) having a shape of 20×20×2 mm, a porosity of about 30% and a surface roughness of #240 to #1,200 and an 8YSZ dense fired film having a shape of 20×20×0.2 mm and a porosity of not more than 1% were prepared. An adhesive was coated onto one surface of the 8YSZ film in a given coated amount, followed by drying at 120° C. As the adhesive, a slurry was used, which was obtained by mixing $Mn_3O_4$ powder having the average particle diameter of 0.3 μm, water, a 5 wt. % aqueous solution of sodium naphthalene sulfonic acid and a 20 wt. % PVA aqueous solution in ratios of 40:100:2:20 in terms of weight, respectively. This coating was effected by spraying the slurry with a spray gun. A coated amount was controlled by adjusting a spraying pressure and a spraying time.

Next, the LCM substrate was placed on the 8 YSZ film such that the adhesive-coated face was covered with the LCM substrate. The thus obtained laminate was placed in an electric furnace, and an alumina sintered body having a given weight was placed on the LCM substrate as a weight. At that time, #240 alumina grinding powder was paved under the 8YSZ film so that a load might be applied uniformly over the surface of the 8YSZ film. Then, the laminate was joined under heating at a temperature of 1,300° C. to 1,500° C. for 0.5 to 5 hours in air, thereby producing a joined body. In order to evaluate mechanical characteristics of the joined body, joint strength was measured. Also, in order to evaluate its electric characteristics, an electric resistance was measured. Results are shown in Tables 1 through 4.

That is, Table 1 shows the relationship between the coated amount of the adhesive and the joint strength with respect to the joined bodies produced under the conditions that the joining load and the joining time were 0.5 kgf/cm² and 0.5 hours, respectively. Table 2 shows the relationship between the coated amount of the adhesive and the electric resistance with respect to the joined bodies produced under the conditions that the joining load and the joining time were 0.5 kgf/cm² and 0.5 hours, respectively. Table 3 shows the relationship between the joining time and the electric resistance with respect to the joined bodies produced under the conditions that the joining load and the joining temperature were 0.5 kgf/cm² and 1,400° C., respectively, and the coated amount of the adhesive was 1.0 mg/cm². Table 4 shows the relationship between the joining load and the electric resistance with respect to the joined bodies produced under the conditions that the coated amount of the adhesive and the joining time were 1.0 mg/cm² and 0.5 hours, respectively.

Figure 2:
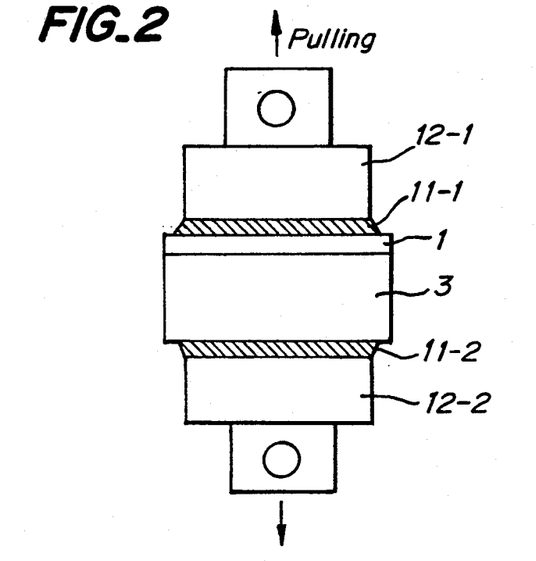
FIG. 2 is a view for illustrating a method for measuring the joint strength of a joined body in the present invention.
Figure 3:
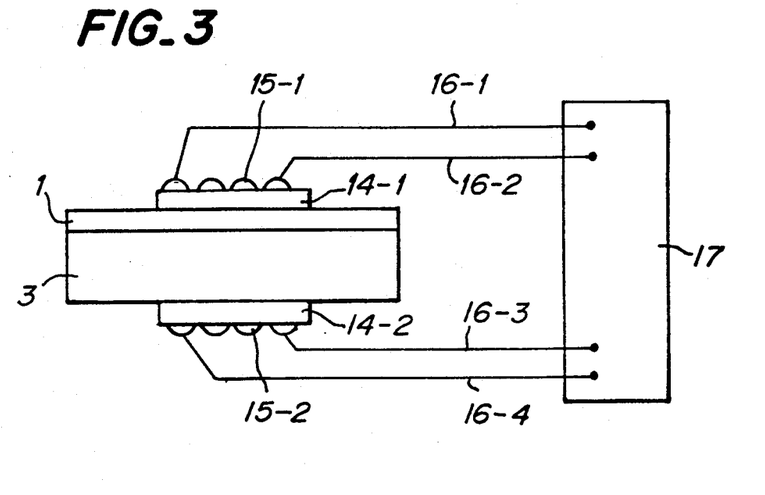
FIG. 3 is a view for illustrating a method for measuring an electric resistance of the joined body in the present invention.

The joining strength shown in Tables 1 through 4 were measured in a state shown in FIG. 2. That is, jigs 12-1 and 12-2 made of brass were bonded to surfaces of the 8YSZ film 1 and the LCM substrate 3 through an epoxy based adhesive 11-1, 11-2, respectively. The laminate was set in an autograph, and pulled to examine fracture strength (peeling of the 8YSZ film). On the other hand, the electric resistance of the joined body was measured by an AC impedance method as shown in FIG. 3. That is, a film of a platinum paste was formed, in a diameter of 6 mm, on a central portion of a surface of each of the LCM substrate 3 and a central portion of a surface of the 8YSZ film by screen printing, and the paste was baked at 1,000° C. for 1 hour in air, thereby producing a measurement sample with platinum electrodes 14-1 and 14-2 formed. Platinum nets 15-1 and 15-2 were provided on surfaces of the platinum electrodes 14-1 and 14-2 of each measurement sample, respectively, and the platinum nets 15-1 and 15-2 were connected to an impedance analyzer 17 through conductors 16-1 through 16-4 as shown in FIG. 3. Then, the electric resistance of the thus obtained assembly was measured at 1,000° C. in air.

TABLE 1

| Coated amount of adhesive (mg/cm²) | Joint strength (gf/cm²) (pulling speed: 10 mm/min) | | | | Remarks |
| --- | --- | --- | --- | --- | --- |
| | 1300° C. | 1400° C. | 1450° C. | 1500° C. (joining temperature) | |
| 0 | not joined | not joined | not joined | 180 | Comparative Example |
| 0.3 | 280 | 530 | 720 | 790 | Invention Example |
| 1.0 | 300 | 690 | 750 | 820 | Invention Example |
| 4.0 | 270 | 610 | 790 | 860 | Invention Example |

TABLE 2

| Coated amount of adhesive (mg/cm²) | Electric resistance (Ω) at frequency of 0.1 Hz/min. | | | | Remarks |
| --- | --- | --- | --- | --- | --- |
| | 1300° C. | 1400° C. | 1450° C. | 1500° C. (joined temperature) | |
| 0 | not joined | not joined | not joined | 98 | Comparative Example |
| 0.3 | 6.0 | 2.4 | 1.7 | 1.8 | Invention Example |
| 1.0 | 6.4 | 0.9 | 1.3 | 1.2 | Invention Example |
| 4.0 | 7.3 | 8.2 | 7.5 | 6.7 | Invention Example |

TABLE 3

| Joining time (hr.) | Electric resistance (Ω) at frequency of 0.1 Hz/min. |
| --- | --- |
| 0.5 | 0.9 |
| 2 | 1.0 |
| 5 | 0.9 |

TABLE 4

| Joining load (kgf/cm²) | Electric resistance (Ω) at frequency of 0.1 Hz/min. | | Remarks |
| --- | --- | --- | --- |
| | 1400° C. | 1500° C. (joining temperature) | |
| 0 | not joined | 31 | Comparative Example |
| 0.1 | 1.5 | 1.1 | Invention Example |
| 0.5 | 0.9 | 1.2 | Invention Example |

TABLE 4-continued

| Joining load (kgf/cm$^2$) | Electric resistance ($\Omega$) at frequency of 0.1 Hz/min. | | Remarks |
|---|---|---|---|
| | 1400° C. | 1500° C. (joining temperature) | |
| 2.0 | 0.9 | 0.9 | Invention Example |

First, it is seen from results in Tables 1 and 2 that it is difficult to join the 8YSZ and the LCM substrate without using the adhesive composed of manganese oxide, and that even when the 8YSZ was joined to the LCM substrate without using the adhesive composed of manganese oxide, the joint strength was small and the 8YSZ film was readily peeled, and the electric resistance was great. Thus, it is seen that such a joined body cannot practically used. To the contrary, when manganese oxide is used as the adhesive, the joint strength of the joined body can be increased, and the electric resistance can be decreased. Thus, reliability in strength and output characteristics of the cell using such a joined body can be improved. With respect to these joined bodies, defects resulting in fracture of the cells, such as cracks, were not observed at all.

On the other hand, it is seen from Table 3 that an extremely short time of such as 0.5 hours is sufficient for joining. Since the joining can be effected in such a short time, the LCM substrate is not almost sintered by firing, and the fuel cell having the small internal resistance can be obtained, while reduction in the porosity of the LCM substrate affording a great influence upon the output power performance of the fuel cell is greatly suppressed. Further, it is seen from Table 4 that although the greater the load the better effect can be obtained, the joining is possible under an extremely small load of such as 0.1 kgf/cm$^2$. The load is preferably not less than 0.5 kgf/cm$^2$. Since the joining can be effected under such a small load, a device for applying a large load as in hot press is unnecessary, so that the installation cost necessary for the production of the fuel cell can be largely reduced.

Experiment 2

Experiment 2 was effected in the same manner as in Experiment 1 except that instead of the adhesive composed of the manganese oxide in Experiment 1, (a) a mixed powder of LCM powder and manganese oxide (MnO$_2$), (b,) a mixed powder of 8YSZ powder and manganese oxide (MnO$_2$), (c) a mixed powder of samarium-doped ceria and manganese oxide (MnO$_2$), (d) or calcium-doped lanthanum manganate (La$_{0.8}$Ca$_{0.2}$Mn$_{1.05}$O$_3$) containing excess manganese (MnO$_2$) was used as an adhesive, and electric resistance of the joined bodies was measured. Table 5 shows the electric resistance with respect to joined bodies obtained under the conditions: the joining load of 0.5 kgf/cm$^2$, the joining temperature of 1,400° C., the joining time of 0.5 hour, and the coated amount of the adhesive of 1.0 mg/cm$^2$, while the mixing ratio by weight of manganese oxide in the above mixed powder (a) was varied. Table 6 shows the electric resistance with respect to joined bodies obtained under the same conditions as in the case using the above mixed powder (a), while the mixing ratio by weight of manganese oxide in the mixed powder (b) was varied. Table 7 shows the electric resistance with respect to joined bodies obtained under the same conditions as in the case using the above mixed powder (a), while the mixing ratio by weight of manganese oxide in the mixed powder (c) was varied. In the above tests, joined bodies obtained by using a powdery adhesive containing completely no manganese oxide were examined, and results thereof are shown in Tables 5-8 as a comparative example. Table 8 shows the electric resistance with respect to joined bodies obtained under the conditions: the joining load of 0.5 kgf/cm$^2$, the joining time of 0.5 hours, and the coated amount of the adhesive (d) of 1.0 mg/cm$^2$, while the joining temperature was varied.

TABLE 5

| Weight ratio (%) of MnO$_2$/LCM | Electric resistance ($\Omega$) at frequency of 0.1 Hz/hr | Remarks |
|---|---|---|
| 0/100 | not joined | Comparative Example |
| 10/90 | 2.0 | Invention Example |
| 50/50 | 1.3 | Invention Example |
| 100/0 | 0.9 | Invention Example |

TABLE 6

| Weight ratio (%) of MnO$_2$/8 YSZ | Electric resistance ($\Omega$) at frequency of 0.1 Hz/hr | Remarks |
|---|---|---|
| 0/100 | not joined | Comparative Example |
| 10/90 | 6.5 | Invention Example |
| 50/50 | 3.8 | Invention Example |
| 100/0 | 0.9 | Invention Example |

TABLE 7

| Weight ratio (%) of MnO$_2$/samarium-doped ceria | Electric resistance ($\Omega$) at frequency of 0.1 Hz/hr | Remarks |
|---|---|---|
| 0/100 | not joined | Comparative Example |
| 10/90 | 3.4 | Invention Example |
| 50/50 | 1.8 | Invention Example |
| 100/0 | 0.9 | Invention Example |

TABLE 8

| Joining temperature (°C.) | Electric resistance ($\Omega$) at frequency of 0.1 Hz/hr |
|---|---|
| 1300 | 5.5 |
| 1400 | 3.7 |
| 1500 | 1.5 |

It is seen from Tables 5 to 7 that no joined bodies can be obtained when no manganese oxide is contained in the adhesive, whereas joined bodies can be obtained even at the joining temperature of 1,400° C., when not less than 10% by weight of manganese oxide is contained in the adhesive. The content of manganese oxide is preferably not less than 50% by weight. On the other hand, it is seen from Table 8 that joined bodies can be obtained with respect to lanthane manganate when excess manganese is contained.

Figure 4:
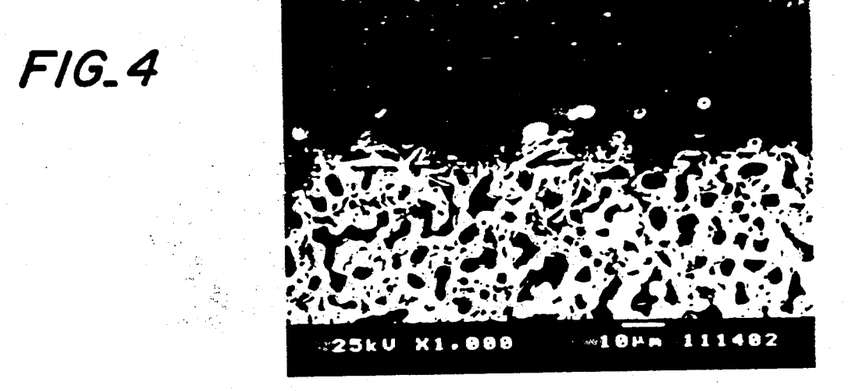
FIG. 4 is an electron microscope photograph showing the particle structure of a joined body at a joined interface in the present invention.
Figure 5:
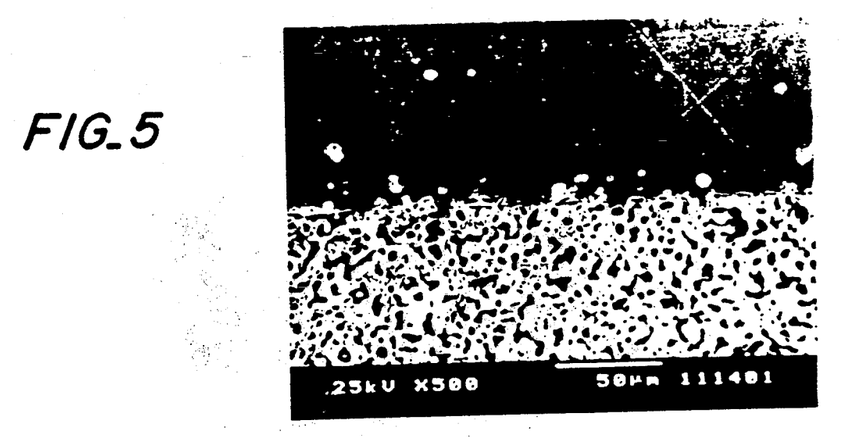
FIG. 5 is another electron microscope photograph showing the particle structure of the joined body at the joined interface in the present invention.

With respect to each of the test samples used in the above-mentioned experiments, a sectional surface near the joined interface was observed by a scanning type electron microscope. FIGS. 4 and 5 show a ground surface of the joined body, by different magnifications, at the same location near the interface of the joined body obtained with use of $Mn_3O_4$ powder as an adhesive under the conditions: the joining load of 0.5 $kgf/cm^2$, the joining temperature of 1,400° C., the joining time of 0.5 hours, and the coated amount of the adhesive of 1.0 $mg/cm^2$. It is seen from FIGS. 4 and 5 that the air electrode and the solid electrolyte are well joined to each other at the joined interface, and that pores are present in the LCM substrate without being collapsed. The porosity determined by analyzing the images of FIGS. 4 and 5 is 31%, which corresponds to that of the LCM substrate before the joining within a deviation of ±1%. Thus, it is understood that the LCM substrate is not sintered nor shrunk by firing for the joining. On the other hand, the 8YSZ film is extremely dense, and no cracks or the like were observed therein. Thus, the 8YSZ film is in an ideal state as a solid electrolyte film for the SOFC.

Figure 6:
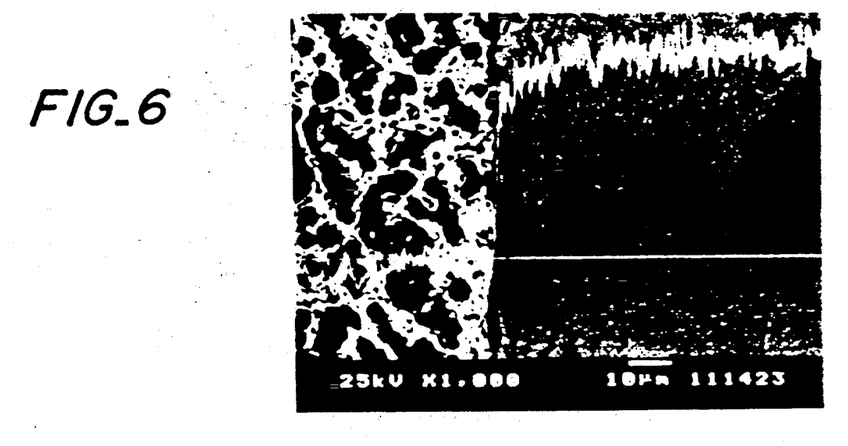
FIG. 6 is an electron microscope photograph showing a result of a Zr-line analysis by EPMA with respect to the joined interface shown in FIG. 4 together with the particle structure.
Figure 7:
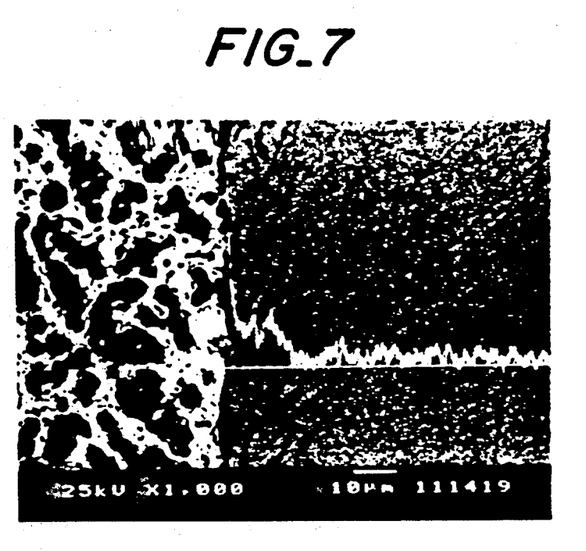
FIG. 7 is an electron microscope photograph showing a result of a Mn-line analysis by EPMA with respect to the joined interface shown in FIG. 4 together with the particle structure.
Figure 8:
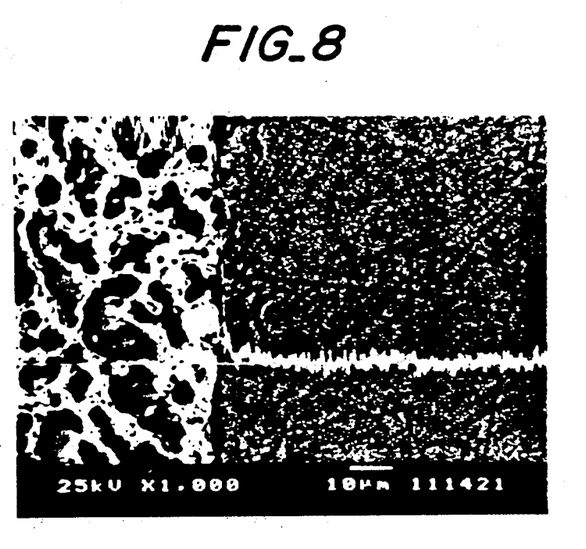
FIG. 8 is an electron microscope photograph showing a result of a La-line analysis by EPMA with respect to the joined interface shown in FIG. 4 together with the particle structure.

The sectional surface of the joined body shown in FIG. 4 was subjected to the line spectrum analysis by using EPMA, and the distribution of Zr, Mn, and La elements near the interface was examined. FIG. 6 shows a result of the analysis of the Zr lines, and FIGS. 7 and 8 show results of the analyses of the Mn lines and the La lines, respectively. It is seen from these results that manganese is diffused near the joined interface of the electrolyte, whereas completely no lanthane is diffused in the 8YSZ film, and that a lanthane zirconate layer being an insulating layer is not formed at all. The manganese coated is diffused into the LCM substrate and the 8YSZ film, and does not remain as a layer. That is, it is considered that the Mn diffused into the YSZ and the LCM enhances the activity of the YSZ and the LCM, and lowers the melting points thereof, and the YSZ and the LCM form the joined interface.

In the test sample in which the LCM substrate was directly joined to the 8YSZ film at 1,500° C. with use of no adhesive, a lanthane zirconate layer was formed at the interface. On the other hand, in the case of the test sample in which the LCM substrate was joined to the 8YSZ film at 1,400° C. with the manganese oxide coated at 4 $mg/cm^2$, a layer of the manganese oxide remained at places. Since the electric conductivity of manganese oxide is smaller as compared with the LCM substrate by about two figures, it is considered that the electric resistance of the test sample having a larger coated amount of manganese oxide is higher than that having a smaller coated amount of manganese oxide.

The following are understood from the above results. That is, when the joined body according to the present invention is employed, the contact resistance at the interface between the solid electrolyte and the electrode in the SOFC can be reduced to an extremely low level. Further, since the porous electrode easily takes in air near the interface can be used without reducing the porosity thereof, the electrode having excellent oxygen-feeding power and being difficult to cause concentration polarization can be obtained. Moreover, since the dense solid electrolyte film having extremely low internal resistance can be used, the solid oxide fuel cell having extremely excellent output characteristics can be obtained.

Experiment 3

In order to examine performances of the actual fuel cell, a paste of nickel-zirconia cermet (Ni:8YSZ=6:4 by volume) was printed by screen in a circular form of 6 mm in diameter, on a surface of the 8YSZ film of the joined body prepared in Experiment 1, i.e., the joined body prepared with use of $Mn_3O_4$ powder as an adhesive under the conditions: the coated amount of the adhesive of 1.0 $mg/cm^2$, the joining load of 0.5 $kgf/cm^2$, the joining temperature of 1,400° C., and the joining time of 0.5 hours, and the printed paste was baked at 1,350° C. in air for 2 to form a fuel electrode 6, thereby preparing a planar SOFC.

Figure 9:
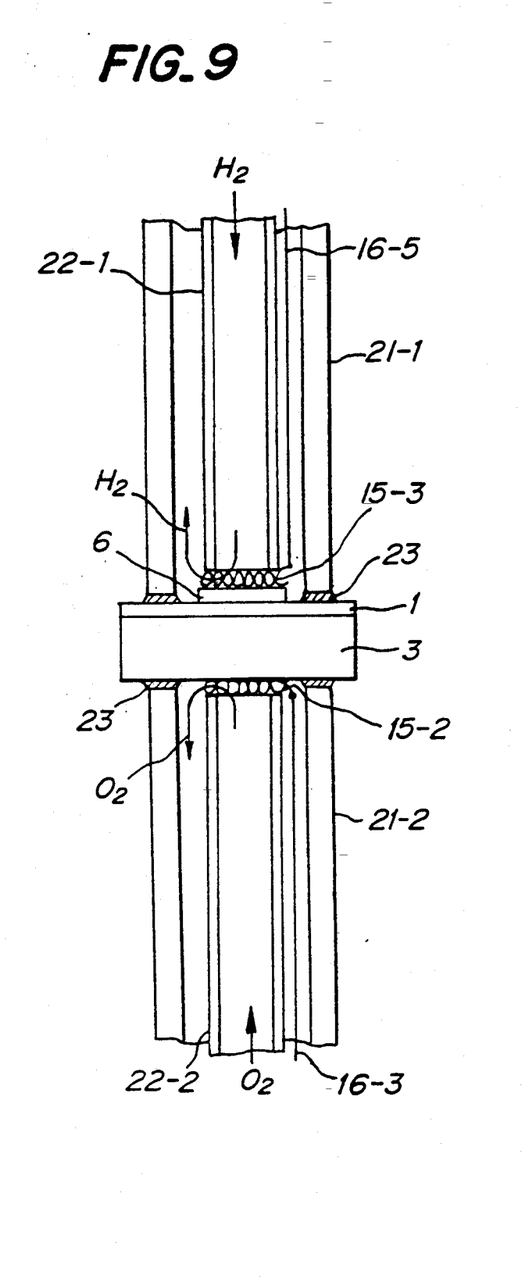
FIG. 9 is a schematic view for illustrating a cell portion in a high temperature gas feeder to be used for the evaluation of performances of the fuel cell in the present invention.

Next, as shown in FIG. 9, in order to collect current, platinum nets 15-2, 15-3, conductors 16-3, 16-5 were provided on the planar SOFC in which the LCM substrate 3 as the air electrode and the $Ni/ZrO_2$ fuel electrode 6 were provided on the 8YSZ film 1, and mullite tubes 21-1 and 21-2 were fitted to the planar SOFC from upper and lower sides, respectively. The tubes 21-1 and 21-2 were sealingly bonded onto the 8YSZ film and the LCM substrate 3 with a glass 23 to prevent mixing of oxygen gas and hydrogen gas. Further, a hydrogen gas-introducing alumina pipe 22-1 and an oxygen gas-introducing alumina pipe 22-2 are inserted into the mullite tubes 21-1 and 21-2, respectively, and connected to respective high temperature gas feeders so that the oxygen gas may contact the LCM substrate 3 and the hydrogen gas may contact the $Ni/ZrO_2$ fuel electrode 6.

Figure 10:
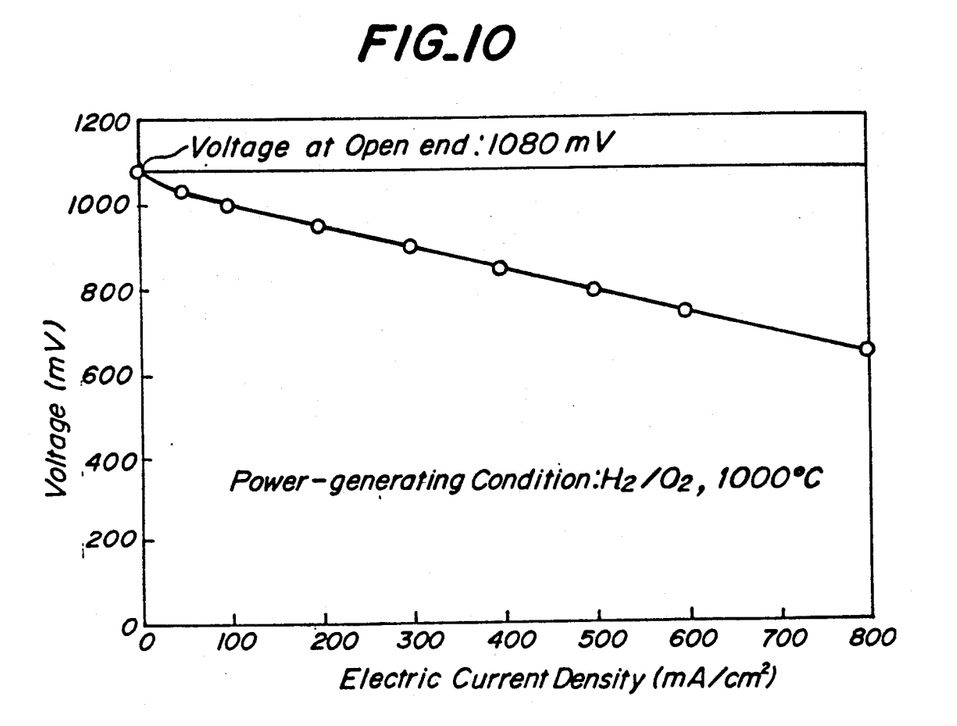
FIG. 10 is a diagram showing an output characteristic of a fuel cell obtained by the producing process according to the present invention.

In this state, hydrogen wetted with moisture corresponding to a saturated vapor pressure at room temperature was introduced into the side of the fuel electrode 6, oxygen gas was introduced into the side of the air electrode, and power was generated by heating the cell to 1,000° C. in an electric furnace. An electric current-voltage curve at that time is shown in FIG. 10. It is seen from the results in FIG. 10 that according to the cell of the present invention, the open end voltage is 1,080 mV, which is substantially equivalent to an ideal voltage of the 8YSZ film according to the Nernst's equation, and even as the density of electric current was increased, reduction in voltage due to ohmic polarization, activation polarization, concentration polarization, etc. was small and generated power output was extremely large.

Experiment 4

Instead of manganese oxide, manganese hydroxide was used as an adhesive of a compound which is converted to manganese oxide by heating. Manganese hydroxide was coated on an LCM substrate in such a coated amount that the coated amount was 1.0 $mg/cm^2$ when considered as the resulting manganese oxide, and a joined body was prepared under the conditions: a joining load of 0.5 $kgf/cm^2$, a joining temperature of 1,400° C., and a joining time of 0.5 hours. The electric resistance of this joined body was 1.0Ω to 1.2Ω, which exhibited the same effects as those obtained when manganese oxide was used as the adhesive. The same effects were obtained when manganese oxalate was used as the adhesive.

Experiment 5

An experiment similar to Experiment 4 was conducted by using cobalt oxide instead of manganese oxide in Experiment 1. That is, CoO powder was coated on an LCM substrate in a coated amount of 1.2 $mg/cm^2$. The electric resistance and the joint strength of this joined body were 1.5Ω to 2.0Ω and 450 $gf/cm^2$, respectively. In this way, satisfactory solid oxide fuel cells can be produced by using cobalt oxide instead of manganese oxide. Further, similar effects can be obtained by using a cobalt compound capable of producing cobalt oxide through oxidation.

The present invention is not limited to the above-mentioned examples, but various modifications, variations and changes could be made. For example, the solid electrolyte film having the thickness of 0.2 mm was used in the above-mentioned experiments. However, since an internal resistance can be further decreased when a solid electrolyte film having a thickness of 0.05 mm is incorporated in a fuel cell, the cell having better characteristics can be produced. Further, as the air electrode, lanthane manganese doped with at least one element selected from alkaline earth metals including strontium may be used besides calcium-doped manganate in the above experiments. Further, other perovskite type composite oxides may be used so long as the oxides have a coefficient of thermal expansion relatively near to that of the YSZ. In addition, as the solid electrolyte, a various kinds of fully stabilized or partially stabilized zirconia may be used besides 8YSZ.

As is clear from the above explanation, according to the present invention, since the stabilized zirconia film and the lanthane manganate substrate ar joined to each other under pressure by heating with use of the adhesive containing manganese or cobalt oxide or compound, the joined body between the solid electrolyte film and the air electrode, which is free from the formation of a high resistance layer composed of lanthane zirconate at the interface, can be easily obtained. As a result, the solid oxide fuel cell having excellent performances can be obtained merely by providing a fuel cell upon the joined body.

What is claimed is:

1. A process for producing a solid oxide fuel cell including a solid electrolyte plate, and an air electrode and a fuel electrode provided on opposite surfaces of said solid electrolyte plate, said process comprising the step of joining a film of oxygen ion-conductive zirconia as the solid electrolyte plate to lanthanum manganate as the air electrode through an adhesive containing a compound selected from a manganese compound and a cobalt compound by press contacting them under heating.

2. The producing process according to claim 1, wherein said lanthanum manganate is $La_x(Ca$ or $Sr)_yMnO_3$ in which $0.95 < x+y \leq 1.05$, $0.6 \leq x \leq 0.90$ and $0.10 \leq y \leq 0.40$.

3. The producing process as set forth in claim 1, wherein said manganese compound-containing adhesive contains a material which is converted into manganese oxide by heating.

4. The producing process as set forth in claim 1, wherein said manganese compound is manganese oxide.

5. The producing process as set forth in claim 1, wherein said cobalt compound-containing adhesive contains a material which is converted into cobalt oxide by heating.

6. The producing process as set forth in claim 1, wherein said cobalt compound is cobalt oxide.

7. The producing process according to claim 1, wherein a content of said manganese compound or the cobalt compound is not less than 10% by weight when calculated as $Mn_3O_4$ or $CoO$.

8. The producing process according to claim 1, wherein a temperature for said joining is from 1,300° C. to 1,450° C.

9. The producing process according to claim 1, wherein a load applied for said joining is from 0.1 to 3 $kgf/cm^2$.

10. The producing process according to claim 1, wherein a time during which said joining is effected is from 0.5 to 5 hours.

11. The producing process according to claim 1, wherein the porosity of said lanthanum manganate is 10-50%.

* * * * *